(12) United States Patent
Han et al.

(10) Patent No.: US 9,395,854 B2
(45) Date of Patent: Jul. 19, 2016

(54) TOUCH SENSING PANEL

(71) Applicant: LG DISPLAY CO., LTD., Seoul (KR)

(72) Inventors: Jonghyun Han, Paju-si (KR);
Byungkoo Kang, Paju-si (KR);
JungSeok Seo, Daejeon (KR)

(73) Assignee: LG Display Co., Ltd., Seoul (KR)

( * ) Notice: Subject to any disclaimer, the term of this patent is extended or adjusted under 35 U.S.C. 154(b) by 30 days.

(21) Appl. No.: 14/056,525

(22) Filed: Oct. 17, 2013

(65) Prior Publication Data
US 2014/0118298 A1 May 1, 2014

(30) Foreign Application Priority Data
Oct. 30, 2012 (KR) .......................... 10-2012-0121513

(51) Int. Cl.
*G06F 3/044* (2006.01)
(52) U.S. Cl.
CPC ...................................... *G06F 3/044* (2013.01)
(58) Field of Classification Search
None
See application file for complete search history.

(56) References Cited

U.S. PATENT DOCUMENTS

| | | | |
|---|---|---|---|
| 9,172,879 B2 * | 10/2015 | Aoshima | ............ H04N 1/00411 |
| 2011/0022351 A1 | 1/2011 | Philipp et al. | |
| 2011/0025639 A1 | 2/2011 | Trend et al. | |
| 2011/0134073 A1 * | 6/2011 | Ahn | .............................. 345/174 |
| 2011/0304566 A1 | 12/2011 | Han | |
| 2012/0062250 A1 | 3/2012 | Kuo | |
| 2013/0043068 A1 * | 2/2013 | Xie et al. | ....................... 174/262 |

FOREIGN PATENT DOCUMENTS

| | | |
|---|---|---|
| CN | 101995993 A | 3/2011 |
| KR | 10-2011-0136433 A | 12/2011 |
| TW | 201211867 A1 | 3/2012 |

* cited by examiner

*Primary Examiner* — Nicholas Lee
*Assistant Examiner* — Duane N Taylor, Jr.
(74) *Attorney, Agent, or Firm* — Birch, Stewart, Kolasch & Birch, LLP

(57) ABSTRACT

Provided is a touch sensing panel including a substrate that includes a touch electrode formation area and an active area formed within the touch electrode formation area; a plurality of first conductive electrode serials that are arranged on the touch electrode formation area of the substrate in such a manner that the first conductive electrode serials are separated from one another along a first direction; a plurality of second conductive electrode serials that are arranged on the touch electrode formation area of the substrate in such a manner that the second conductive electrode serials are separated from one another along a second direction intersecting the first direction and that are electrically insulated from the first conductive electrode serials; and a plurality of sensing nodes that are positioned at crossings of the first conductive electrode serials and the second conductive electrode serials.

5 Claims, 18 Drawing Sheets

TOUCH SENSING PANEL

This application claims the benefit of priority under 35 U.S.C. §119(a) to Korea Patent Application No. 10-2012-0121513 filed on Oct. 30, 2012, the entire contents of which is incorporated herein by reference herein in its entirety.

BACKGROUND OF THE INVENTION

1. Field of the Invention

This disclosure relates to a touch sensing panel and more particularly to a capacitive touch sensing panel that is capable of improving performance of touch precision of corners part or edges thereof.

2. Discussion of the Related Art

In recent years, various input devices such as a keyboard, a mouse, a joystick and a digitizer are used for constructing interface between users and home appliances or information telecommunication devices. However, when a user makes use of the input devices, user's dissatisfaction increases because the user is required to know how to use the input devices and the input devices occupy space. Therefore, a convenient and simple input device that can reduce erroneous operation is required. According to the requirement, there proposed a touch sensor that can input information by directly contacting a screen with a user's finger or a pen.

Touch sensing panels are classified into a resistive type, a capacitive type, an electromagnetic type according to a detection method of a touched portion. The resistive type touch sensing panel determines a touched position by a voltage gradient according to a change of resistance in a state that a DC voltage is applied to metal electrodes formed on an upper plate or a lower plate. The capacitive type touch sensing panel senses a touched position according to a difference in capacitance created in an upper or lower plate when the user physically contacts with a conductive film formed on the upper or lower plate. The electromagnetic type touch sensing panel detects a touched portion by reading an LC value induced as an electromagnetic pen touches a conductive film. In addition to above-mentioned type touch sensing panels, optical type and ultrasonic type touch sensing panels are known.

Among the above-mentioned touch sensing panels, the capacitive type touch sensing panel is classified into a self capacitive type touch sensing panel and a mutual capacitive type touch sensing panel. The self capacitive type touch sensing panel has a construction in which a plurality of independent patterns are formed in touch area. In the self capacitive type touch sensing panel, touched positions are detected by measuring change of capacitances of the independent patterns. The mutual capacitive type touch sensing panel has a matrix construction in which first electrode patterns (e.g., touch driving electrodes) arranged in an x-axis direction cross over second electrode patterns (e.g., touch sensing electrodes) arranged in a y-axis direction. In the mutual capacitive type touch screen panel, touch positions are detected by measuring changes of capacitances appeared to sensing nodes which are defined by cross points of the touch driving and sensing electrodes through the touch sensing electrodes after supplying a driving voltage to the touch driving electrodes.

Hereinafter, a related art capacitive type touch sensing panel for a display device will be described with reference to FIGS. 1A and 1B. FIG. 1A is a planar view illustrating a related art capacitive type touch sensing panel for a display device, and FIG. 1B is conceptive view illustrating sensing nodes formed on the touch sensing panel shown in FIG. 1A.

Referring to FIGS. 1A and 1B, the capacitive type touch sensing panel includes a touch electrode forming area TA, an active area AA, a routing wire forming area RA and a pad forming area PA. Touch electrodes having touch driving electrodes and touch sensing electrodes are formed on the touch electrode forming area TA. The active area AA is an area corresponding to area on which data of a display device are displayed. Routing wires are formed on the routing wire forming area RA to be connected to the touch electrodes. Routing pads are formed on the pad forming area PA to connect the routing wires to signal lines of a touch processor (not shown).

The touch electrode forming area TA includes a plurality of first touch electrode serials TS1 to TS5 arranged in parallel in a first direction (e.g. x axis direction), and a plurality of second touch electrode serials RS1 to RS5 arranged in parallel in a second direction (e.g. y axis direction) crossing over the first direction. Positions where the plurality of first touch electrode serials TS1 to TS5 cross over the plurality of second touch electrode serials RS1 to RS6 are referred to as sensing nodes n11 to n56. The plurality of first touch electrode serials TS1 to TS5 cross over the plurality of second touch electrode serials RS1 to RS6 with an insulation layer (not shown) therebetween not to contact with each other at the sensing nodes n11 to n56.

The routing wire forming area RA is disposed outside the touch electrode forming area RA, and includes a plurality of first routing wires TW1 to TW5 connected to the plurality of first touch electrode serials TS1 to TS5, respectively and a plurality of second routing wires RW1 to RW6 connected to the plurality of second touch electrode serials RS1 to RS6, respectively.

The pad forming area PA includes a plurality of first routing pads TP1 to TP5 connected to the plurality of first routing wires TW1 to TW5, respectively and a plurality of second routing pads RP1 to RP6 connected to the plurality of second routing wire RW1 to RW6, respectively.

The mentioned above capacitive type touch sensing panel is a device which detects touch positions by finding changes of capacitances at the sensing nodes n11 to n56 adjacent to the touch positions when an user touches the touch sensing panel with fingers or a conductive metal such as a stylus pen. As thus, the sensing nodes n11 to n56 are used as a reference to trace touch positions. Accordingly, the touch electrode forming area TA is set to have an area larger than the active area AA so that it is possible to touch an entire area of the active area AA corresponding to a display area of the display device. However touches are not exactly performed on the sensing nodes n11 to n56 but mostly performed on positions between the sensing nodes n11 to n56. Accordingly, the touch sensing panel detects touch positions by processing data collected from the sensing nodes adjacent to the touch positions.

FIG. 2 is a planar view illustrating sensing nodes of the related art touch sensing panel usable according to touch positions. In FIG. 2, symbols A, B and C indicate touch positions in an active area of touch sensing panel.

Referring to FIG. 2, in case that a touch is performed at the touch position A in the active area AA, it is possible to use nine sensing nodes n34, n35, n36, n44, n45, n46, n54, n55 and n56 adjacent to the touch position A to obtain the touch position A. Also, in case that a touch is performed at the touch position B including a sensing node n41 at one edge of the active area AA, it is possible to use six sensing nodes n31, n32, n41, n42, n51 and n52 adjacent to the touch position B to obtain the touch position B. However, in case that a touch is performed at the touch position B' having no sensing node at the one edge of the active area AA, it is possible to use only two sensing nodes n31 and n41 adjacent to the touch position B' to obtain the touch position B'. Also, in case that a touch is performed at a touch position C including a sensing node n11 at one corner of the active area AA, it is possible to use four sensing nodes n11, n12, n21 and n22 adjacent to the touch position C to obtain the touch position C. However, in case that a touch is performed at the touch position C' having no sensing node at the one corner of the active area AA, it is possible to use only one sensing node n11 adjacent to the touch position C' to obtain the touch position C'.

As thus, in case that a touch is performed at inside edges or corners of the active area AA, it is possible to use many sensing nodes adjacent to the touch position, thereby capable of obtaining the touch positions exactly. However, in case that a touch is performed at edges or corners of the active area AA, it is possible to use a few sensing nodes adjacent to the touch position. The touch position obtained by using the few sensing nodes leads a real touch position to an erroneous touch position which is biased to inner side of the active area AA. In particular, in case that a touch is performed at edges or corners of the active area AA having no sensing node, it is impossible to obtain an exact touch position because it is possible to use only one or two sensing nodes.

Accordingly, it is required to prevent erroneous detection of the touch position due to insufficiency of sensing nodes when a touch is performed at edges or corners of the active area AA having no sensing node.

Accordingly, the requirement of a touch sensing panel capable of solving the problems of the related art touch sensing panel was on the rise.

SUMMARY

An object of this disclosure is to provide a touch sensing panel, an electrostatic capacitance type, which is capable of increasing performance of touch input with improved precision of touch with respect to a corner part and an edge part.

According to an aspect of this disclosure, there is provided a touch sensing panel including a substrate that includes a touch electrode formation area and an active area formed within the touch electrode formation area; a plurality of first conductive electrode serials that are arranged on the touch electrode formation area of the substrate in such a manner that the first conductive electrode serials are separated from one another along a first direction; a plurality of second conductive electrode serials that are arranged on the touch electrode formation area of the substrate in such a manner that the second conductive electrode serials are separated from one another along a second direction intersecting the first direction and that are electrically insulated from the plurality of first conductive electrode serials; and a plurality of sensing nodes that are positioned at crossings of the plurality of first conductive electrode serials and the plurality of second conductive electrode serials, wherein at least one line of sensing nodes of an uppermost line of sensing nodes and a lowermost line of sensing nodes among the plurality of sensing nodes is positioned in a borderline of the active area or is positioned within the touch electrode formation area that is positioned outside of the borderline of the active area.

In the touch sensing panel, at least one line of sensing nodes of a leftmost line of sensing nodes and a rightmost line of sensing nodes among the plurality of sensing nodes is positioned in the borderline of the active area or is positioned within the touch electrode formation area that is positioned outside of the borderline of the active area.

In the touch sensing panel, at least one of an uppermost first conductive electrode serial and a lowermost first conductive electrode serial among the plurality of first conductive electrode serials is formed on up to the touch electrode formation area that is positioned outside of the borderline of the active area.

In the touch sensing panel, each of the plurality of first conductive electrode serials are formed of a plurality of electrode patterns, and the leftmost electrode patterns of the plurality of first conductive electrode serials are formed on up to the touch electrode formation area that is positioned outside of the borderline of the active area, and the leftmost electrode pattern is larger in size than an inner electrode pattern that is formed within the active area.

In the touch sensing panel, each of the plurality of first conductive electrode serials are formed of a plurality of electrode patterns, and the rightmost electrode patterns of the plurality of first conductive electrode serials are formed on up to the touch electrode formation area that is positioned outside of the borderline of the active area, the rightmost electrode pattern is larger in size than the inner electrode pattern that is formed within the active area.

BRIEF DESCRIPTION OF THE DRAWINGS

The teachings of the embodiments can be readily understood by considering the following detailed description in conjunction with the accompanying drawings.

DETAILED DESCRIPTION

Figure 1A:
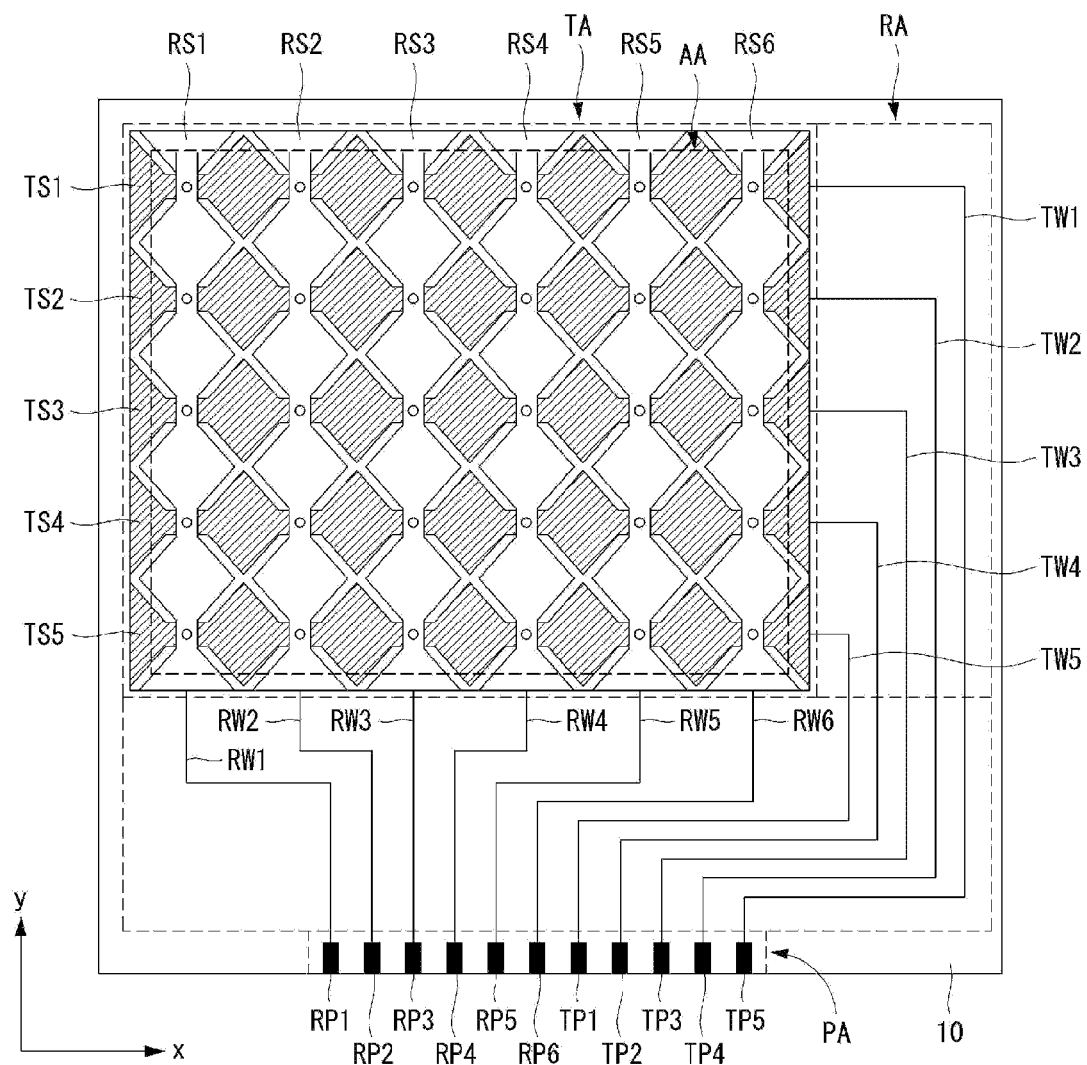
FIG. 1A is a plane view illustrating a related art capacitive type touch sensing panel for a display apparatus.
Figure 1B:
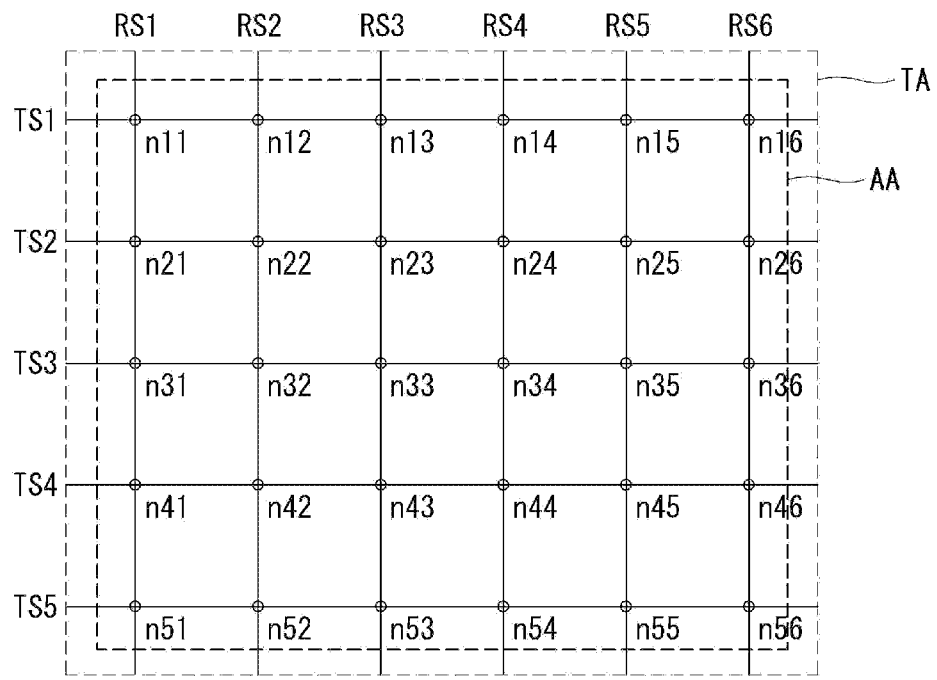
FIG. 1B is a conceptive view illustrating sensing nodes formed on the touch sensing panel shown in FIG. 1A.
Figure 2:
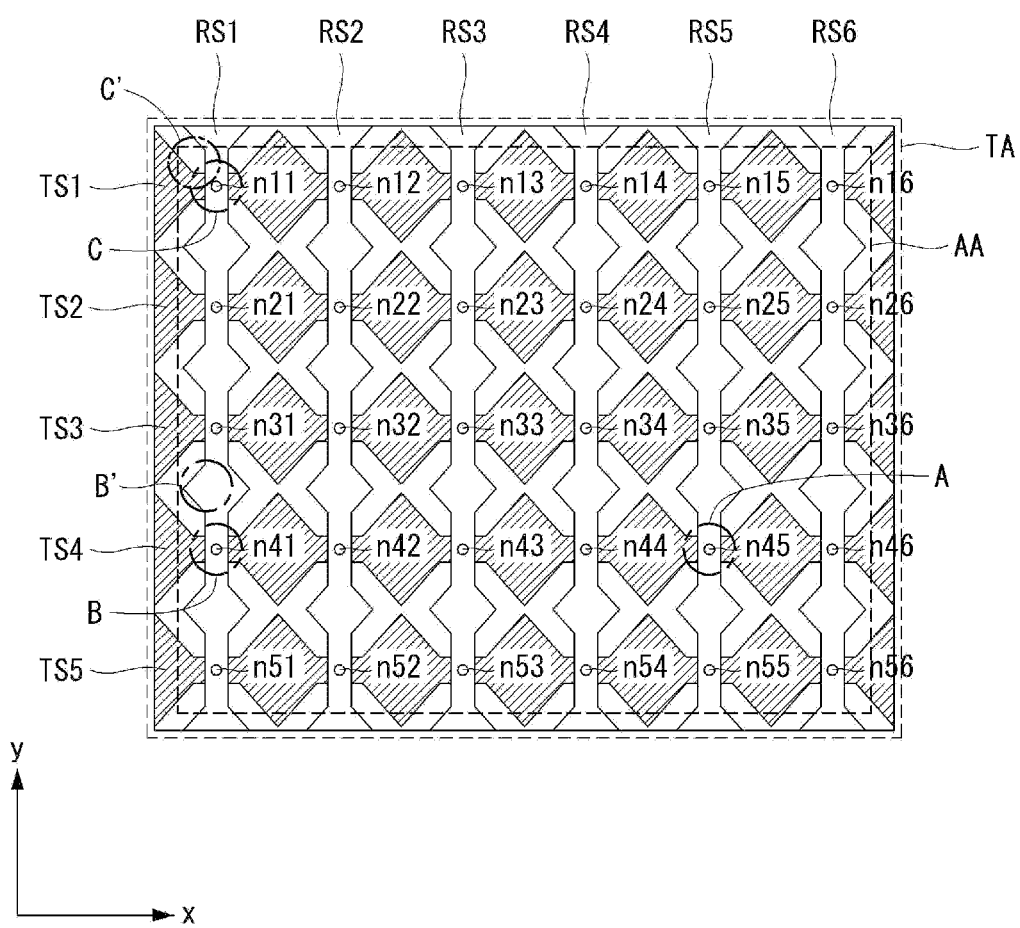
FIG. 2 is a plane view illustrating the sensing nodes on the touch sensing panel that are usable according to a touch position in order to determine the touch position.

Hereinafter, exemplary embodiments of this disclosure will be described in detail with reference to the accompanying drawings, wherein same reference numerals may be used to denote the same or substantially the same elements throughout the specification and the drawings.

Figure 3A:
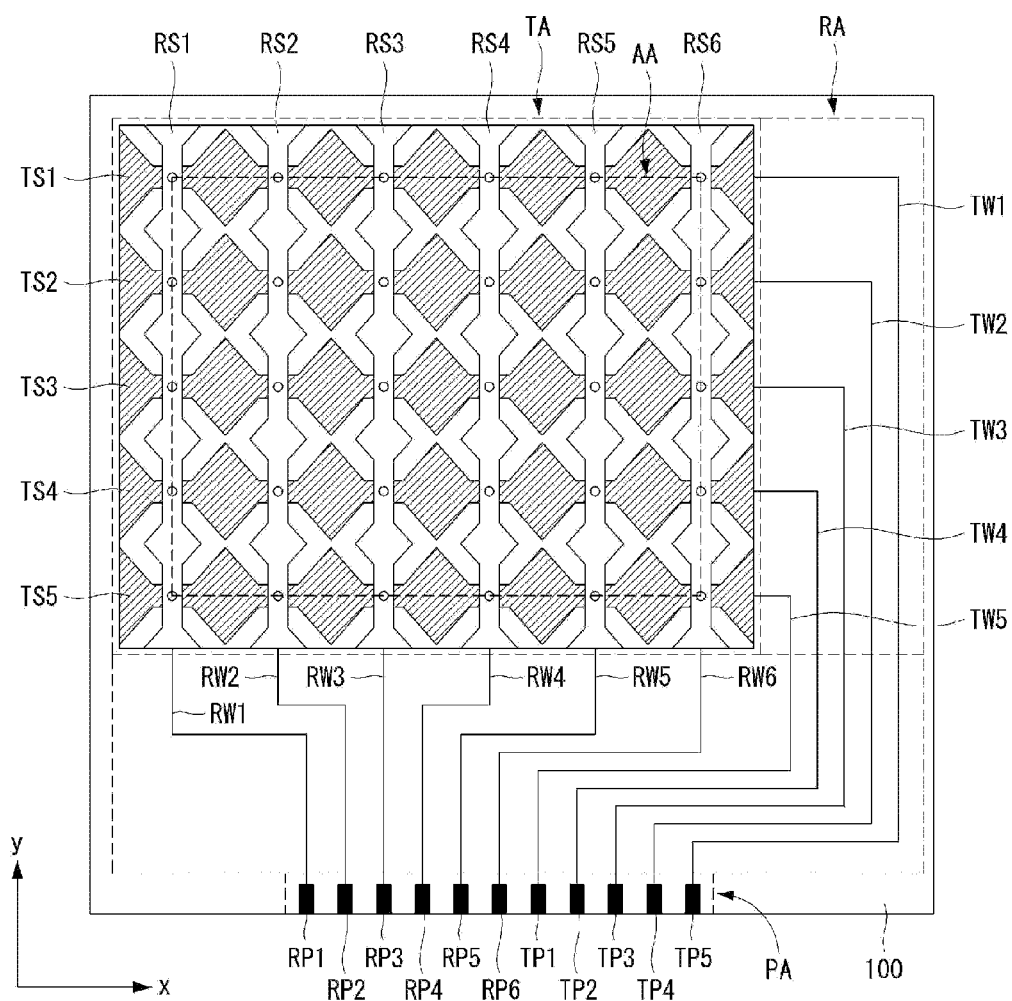
FIG. 3A is a plane view illustrating a touch sensing panel according to a first embodiment of this disclosure.
Figure 3B:
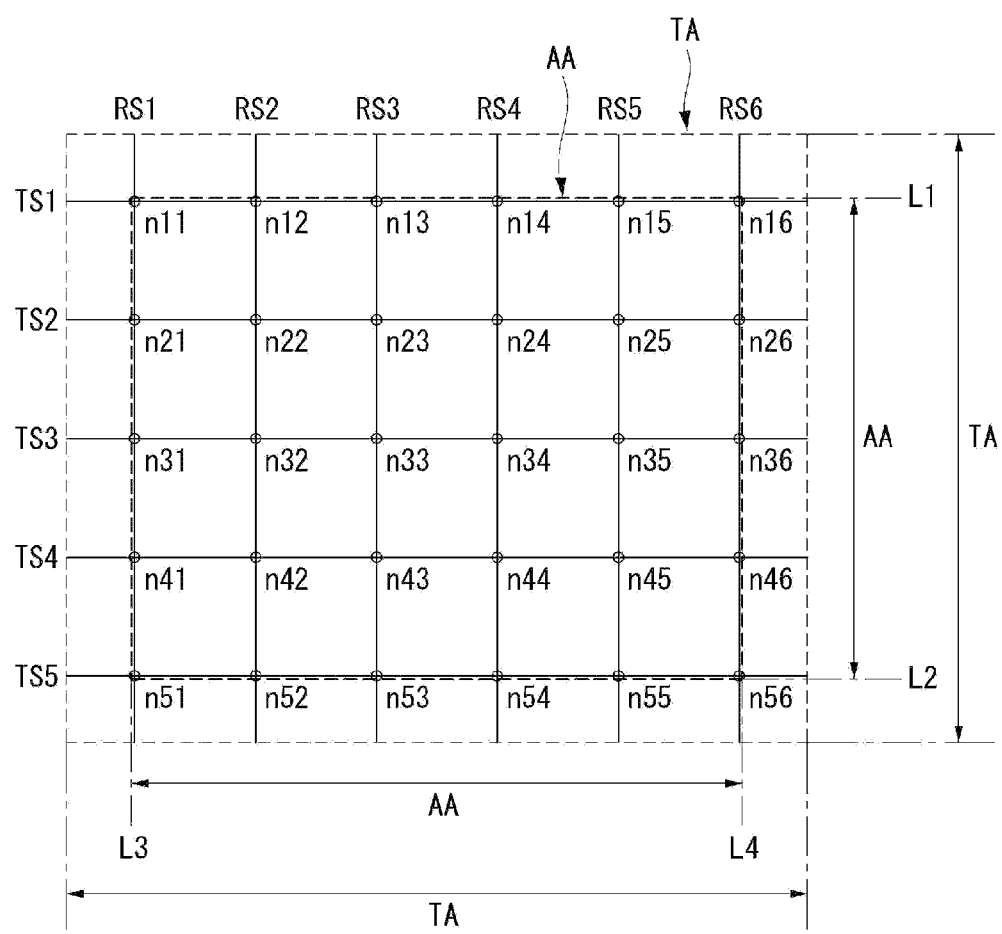
FIG. 3B is a conceptual view illustrating sensing nodes formed on the touch sensing panel shown in FIG. 3A.
Figure 4:
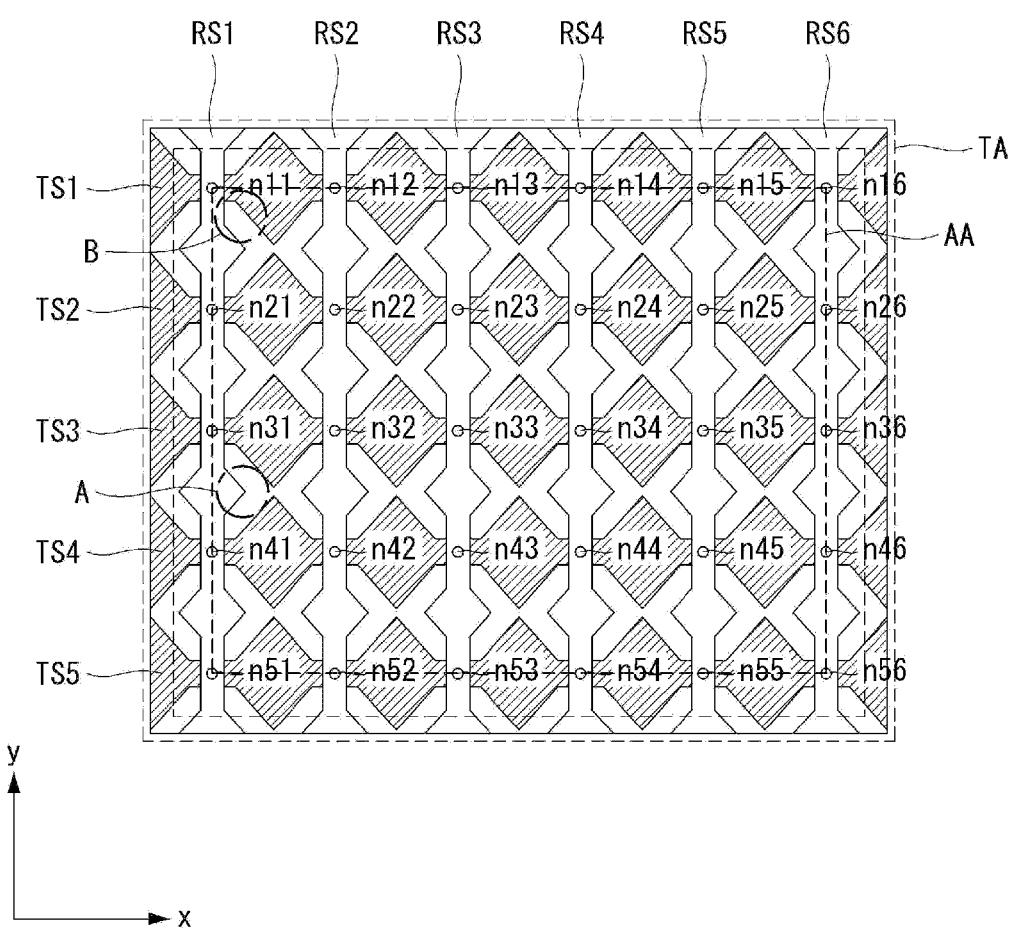
FIG. 4 is a plane view illustrating a relationship between a touch area and an active area of the touch sensing panel according to the first embodiment of this disclosure.

A touch sensing panel according to a first embodiment of this disclosure is described referring to FIGS. 3A, 3B and 4. FIG. 3A is a plane view illustrating the touch sensing panel according to the first embodiment of this disclosure. FIG. 3B is a conceptual view illustrating sensing nodes formed on the touch sensing panel shown in FIG. 3A. FIG. 4 is a plane view illustrating a relationship between a touch area and an active area of the touch sensing panel according to the first embodiment of this disclosure.

Referring to FIGS. 3A, 3B and 4, the touch sensing panel according to the first embodiment of this disclosure includes a touch electrode formation area TA, an active area AA, a routing wiring formation area RA, and a pad formation area PA. Touch electrodes, provided with touch drive electrodes and touch sensing electrodes, are formed on the touch electrode formation area TA. The active area AA corresponds to a display area of a display apparatus (not illustrated) on which display data are displayed. Routing wirings, connected to the touch electrodes formed on the touch electrode formation area TA, are formed on the routing wiring formation area RA. Routing pads for connecting the routing wirings and signal lines of a touch drive circuit (not illustrated) are formed on the pad formation area PA.

The touch electrode formation area TA includes a plurality of first touch electrode serials TS1 to TS5 (touch drive electrode serials or touch sensing electrode serials), a plurality of second touch electrode serials RS1 to RS6 (touch sensing electrode serials or touch drive electrode serials), and sensing nodes n11 to n56. The plurality of first touch electrode serials TS1 to TS5 are arranged in parallel on a transparent substrate 100, in a first direction (for example, in the X-axis direction). The plurality of second touch electrode serials RS1 to RS6 are arranged in parallel in a second direction (for example, the Y-axis direction) in such a manner as to intersect the plurality of first touch electrode serials TS1 to TS5, respectively, with an insulation layer (not illustrated) in between. As illustrated in FIG. 3B, the sensing nodes n11 to n56 are formed at crossings of the plurality of first touch electrode serials TS1 to TS5 and the plurality of second touch electrode serials RS1 to RS6.

The active area AA is one part of the touch electrode formation area TA defined by intersecting a first imaginary line L1, a second imaginary line L2, a third imaginary line L3, and a fourth imaginary line L4. The first imaginary line L1 connects the uppermost sensing nodes n11, n12, n13, n14, n15, and n16 within the touch electrode formation area TA. The second imaginary line L2 connects the lowermost sensing nodes n51, n52, n53, n54, n55, and n56. The third imaginary line L3 connects the leftmost sensing nodes n11, n21, n31, n41 and n51. The fourth imaginary line L4 connects the rightmost sensing nodes n16, n26, n36, n46 and n56.

The routing wiring formation area RA is formed outside of the touch electrode formation area TA and includes a plurality of first routing wirings TW1 to TW5 and a plurality of second routing wirings RW1 to RW6. The first routing wirings TW1 to TW5 are connected to the plurality of first electrode serials TS1 to TS5, respectively. The second routing wirings RW1 to RW6 are connected to the plurality of second electrode serials RS1 to RS6, respectively. Each of the first routing wirings TW1 to TW5 and each of the second routing wirings RW1 to RW6 are made of a metal material, such as Al, AlNd, Mo, MoTi, Cu, Cr, Ag, and Ag alloy.

The pad formation area PA is formed outside of the routing wiring formation area RA and includes a plurality of first routing pads TP1 to TP5 and a plurality of second routing pads RP1 to RP6. The first routing pads TP1 to TP5 are connected to the plurality of first electrode serials TS1 to TS5 through the first routing wirings TW1 to TW5, respectively. The second routing pads RP1 to RP6 are connected to the plurality of second electrode serials RS1 to RS6 through the second routing wirings RW1 to RW6, respectively. Each of the first routing pads TP1 to TP5 and each of the second routing pads RP1 to RP6 are made of a metal material, such as Al, AlNd, Mo, MoTi, Cu, Cr, Ag, and Ag alloy.

In the above-described touch sensing panel according to the first embodiment of this disclosure, the outermost sensing nodes n11, n12, n13, n14, n15, n16, n26, n36, n46, n56, n55, n54, n53, n52, n51, n41, n31, and n21 are formed in such a manner that they are positioned on a borderline of the active area AA.

Therefore, even though a touch is applied to an edge part A of the active area AA as illustrated in FIG. 4, the sensing nodes n31, n32, n41, and n42 that are positioned adjacent to a touch position A can be used to calculate the touch position A. Thus, a number of the sensing nodes used to calculate the touch position A are two more than that of sensing nodes required in the related art. This provides an effect of calculating the touch position more precisely than in the related art.

In addition, even though the touch is applied to a corner part B of the active area AA, the sensing nodes n11, n12, n21 and n22 that are positioned adjacent to a touch position B can be used to calculate the touch position B. Thus, a number of sensing nodes used to calculate the touch position B are three of that of sensing nodes required in the related art. This provides the effect of calculating the touch position more precisely than in the related art.

Figure 5A:
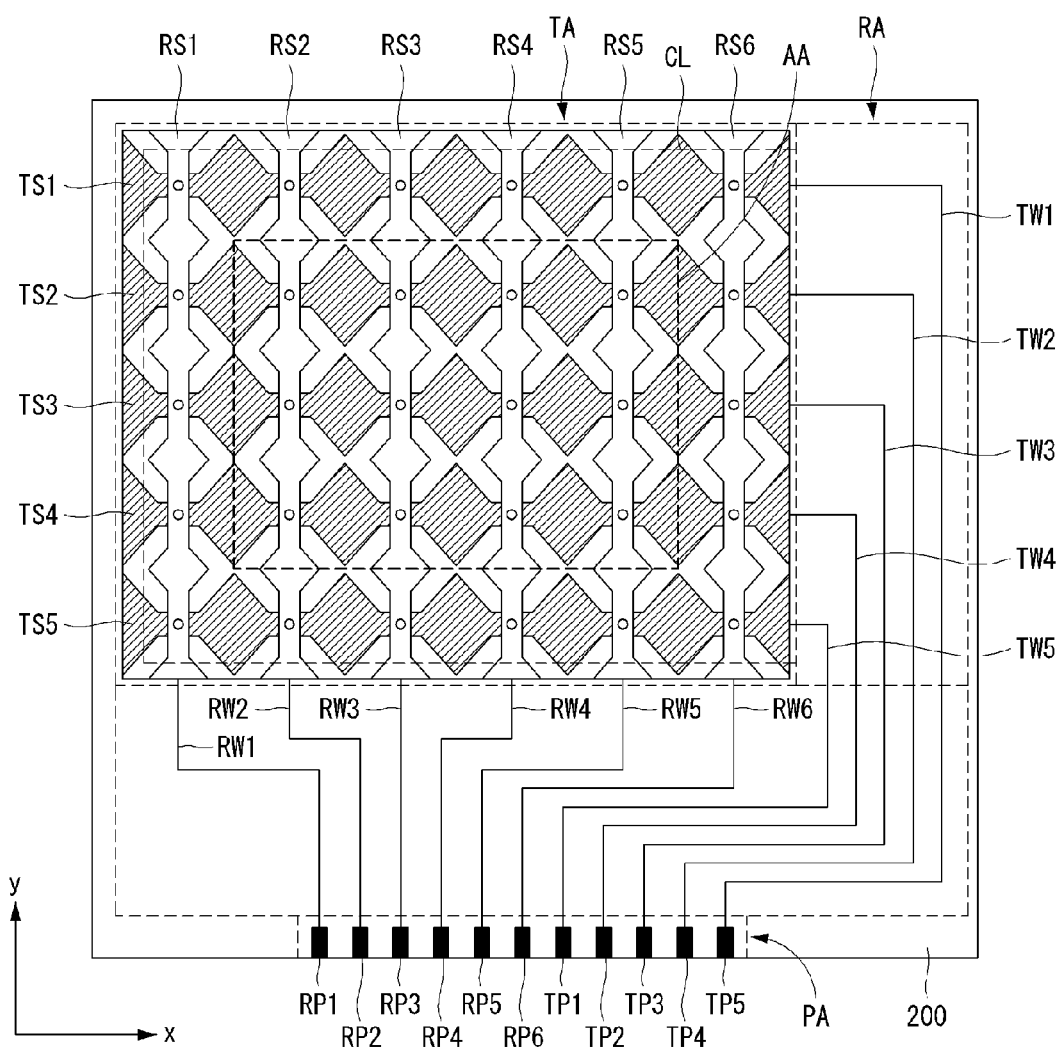
FIG. 5A is a plane view illustrating a touch sensing panel according to a second embodiment of this disclosure.
Figure 5B:
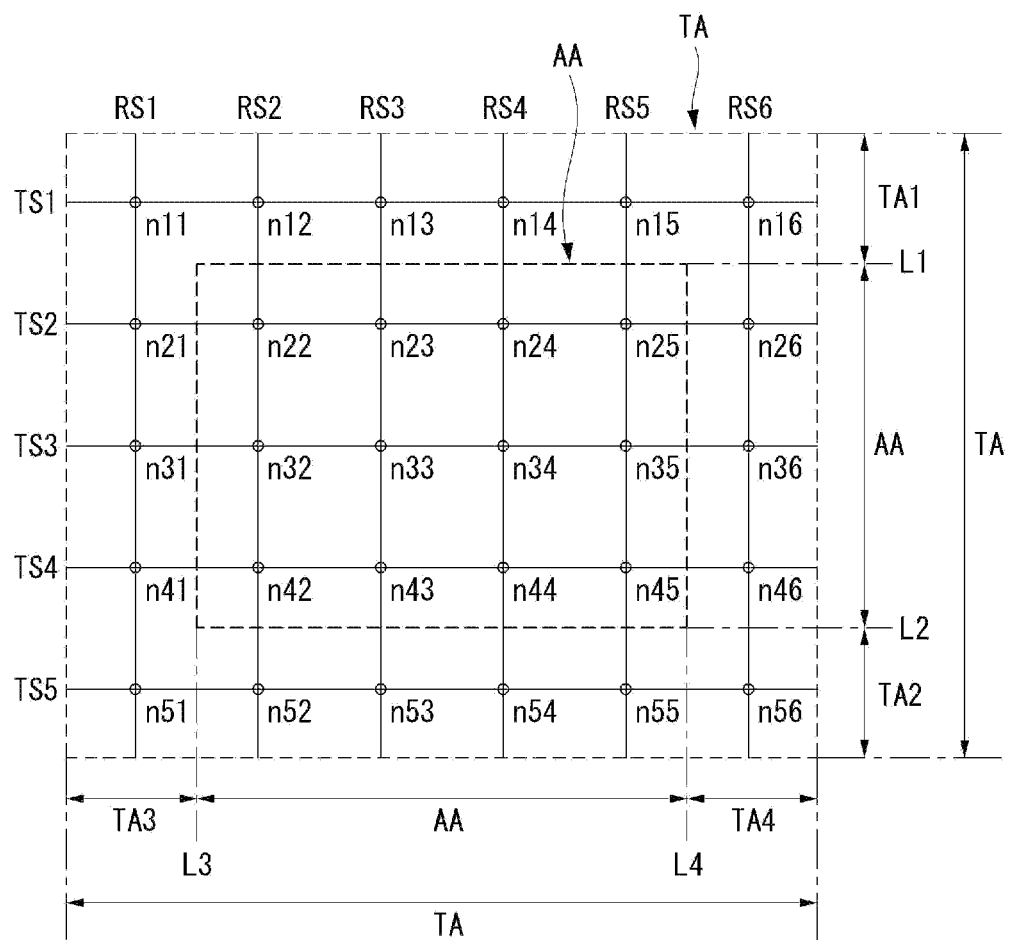
FIG. 5B is a conceptual view illustrating sensing nodes formed on the touch sensing panel shown in FIG. 5A.
Figure 6:
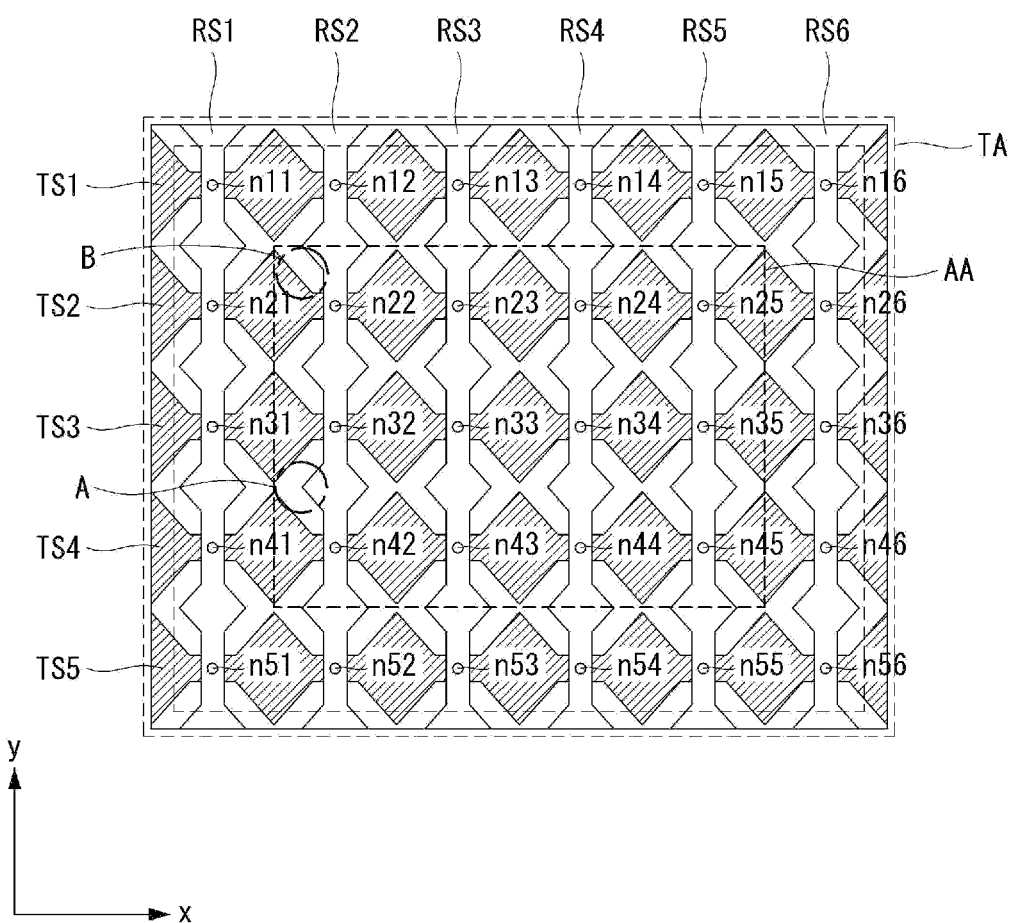
FIG. 6 is a plane view illustrating a relationship between a touch area and an active area of the touch sensing panel according to the second embodiment of this disclosure.

Next, a touch sensing panel according to a second embodiment of this disclosure is described referring to FIGS. 5A, 5B and 6. FIG. 5A is a plane view illustrating the touch sensing panel according to the second embodiment of this disclosure. FIG. 5B is a conceptual view illustrating sensing nodes formed on the touch sensing panel shown in FIG. 5A. FIG. 6 is a plane view illustrating a relationship between a touch area and an active area of the touch sensing panel according to the second embodiment of this disclosure.

Referring to FIGS. 5A, 5B and 6, the touch sensing panel according to the second embodiment of this disclosure includes a touch electrode formation area TA, an active area AA, a routing wiring formation area RA, and a pad formation area PA. Touch electrodes are formed on the touch electrode formation area TA. The active area AA corresponds to a display area of a display apparatus (not illustrated) on which display data are displayed. Routing wirings are formed on the routing wiring formation area RA, in order to transmit and receive a signal to and from the touch electrode formation area TA. Routing pads for connecting the routing wirings and signal lines of a touch drive circuit (not illustrated) are formed on the pad formation area PA. The touch sensing panel according to the second embodiment is different from the touch sensing panel according to the first embodiment in that the active area AA is positioned within a line that connects the outermost sensing nodes n11, n12, n13, n14, n15, n26, n36, n46, n56, n55, n54, n53, n52, n51, n41, n31, and n21.

The touch electrode formation area TA includes a plurality of first touch electrode serials TS1 to TS5 (touch drive electrode serials), a plurality of second touch electrode serials RS1 to RS6 (touch sensing electrode serials), and sensing nodes n11 to n56. The plurality of first touch electrode serials TS 1 to TS5 are arranged in parallel on a transparent substrate 200, in a first direction (for example, x-axis direction). The plurality of second touch electrode serials RS1 to RS6 are arranged in parallel in a second direction (for example, y-axis direction) in such a manner as to cross over the plurality of first touch electrode serials TS1 to TS5, respectively, with an insulation layer (not illustrated) therebetween. As illustrated in FIG. 5B, the sensing nodes n11 to n56 are formed at crossings of the plurality of first touch electrode serials TS1 to TS5 and the plurality of second touch electrode serials RS1 to RS6.

As illustrated in FIGS. 5A and 5B, the active area AA is one part of the touch electrode formation area TA. That is, the active area AA is formed within an area defined by intersecting a first imaginary line L1, a second imaginary line L2, a third imaginary line L3, and a fourth imaginary line L4. The uppermost sensing nodes n11, n12, n13, n14, n15, and n16 are outside the first imaginary line L1 of the active area AA. The lowermost sensing nodes n51, n52, n53, n54, n55, and n56 are outside the second imaginary line L2 of the active area AA. The leftmost sensing nodes n11, n21, n31, n41 and n51 are outside the third imaginary line L3 of the active area AA. The rightmost sensing nodes n16, n26, n36, n46 and n56 are outside the fourth imaginary line L4 of the active area AA.

The sensing nodes are formed in the touch electrode formation area TA outside of the active area AA. In the touch sensing panel according to the second embodiment of this disclosure, the sensing nodes n11, n12, n13, n14, n15, and n16 are formed in the touch electrode formation area TA1 outside of the uppermost edge of the active area AA. And the sensing nodes n51, n52, n53, n54, n55, and n56 are formed in the touch electrode formation area TA2 outside of the lowermost edge of the active area AA. And the sensing nodes n11, n21, n31, n41, and n51 are formed in the touch electrode formation area TA3 outside of the leftmost edge of the active area AA. And the sensing nodes n16, n26, n36, n46, and n56 are formed in the touch electrode formation area TA4 outside of the rightmost edge of the active area AA.

Reference character CL denotes a cutting line in the touch sensing panel according to the second embodiment shown in FIG. 5. However, the cutting line CL is formed in such a manner that the outermost sensing nodes n11, n12, n13, n14, n15, n16, n26, n36, n46, n56, n55, n54, n53, n52, n51, n41, n31, and n21 are not positioned outside of the cutting line CL. Touch is not actually applied to the touch electrode formation area TA outside of the active area AA. Therefore, when the touch electrodes outside of the cutting line CL are removed, an effect of reducing a size of a bezel is accomplished.

The routing wiring formation area RA is formed outside of the touch electrode formation area TA and includes a plurality of first routing wirings TW1 to TW5 and a plurality of second routing wirings RW1 to RW6. The first routing wirings TW1 to TW5 are connected to the first electrode serials TS1 to TS5, respectively. The second routing wirings RW1 to RW6 are connected to the second electrode serials RS1 to RS6, respectively. Each of the first routing wirings TW1 to TW5 and each of the second routing wirings RW1 to RW6 are made of a metal material, such as Al, AlNd, Mo, MoTi, Cu, Cr, Ag, and Ag alloy.

The pad formation area PA is formed outside of the routing wiring formation area RA and includes a plurality of first routing pads TP1 to TP5 and a plurality of second routing pads RP1 to RP6. The first routing pads TP1 to TP5 are connected to the of first electrode serials TS1 to TS5 through the first routing wirings TW1 to TW5, respectively. The second routing pads RP1 to RP6 are connected to the second electrode serials RS1 to RS6 through the second routing wirings RW1 to RW6, respectively. Each of the first routing pads TP1 to TP5 and each of the second routing pads RP 1 to RP6 are made of a metal material, such as Al, AlNd, Mo, MoTi, Cu, Cr, Ag, and Ag alloy.

In the above-described touch sensing panel according to the second embodiment of this disclosure, the sensing nodes are formed on the touch electrode formation areas TA1, TA2, TA3, and TA4 outside of the active area AA.

Therefore, even though a touch is applied to an edge part A of the active area AA as illustrated in FIG. 6, the sensing nodes n31, n32, n41, and n42 that are positioned adjacent to a touch position A can be used to calculate the touch position A. Thus, a number of sensing nodes used to calculate the touch position A are two more than that sensing nodes required in the related art. This provides an effect of calculating the touch position more precisely than in the related art.

In addition, even though the touch is applied to a corner part B of the active area AA, the sensing nodes n11, n12, n21 and n22 that are positioned adjacent to a touch position B can be used to calculate the touch position B. Thus, a number of sensing nodes used to calculate the touch position B are three more than that of sensing nodes required in the related art. This provides the effect of calculating the touch position more precisely than in the related art.

Figure 7A:
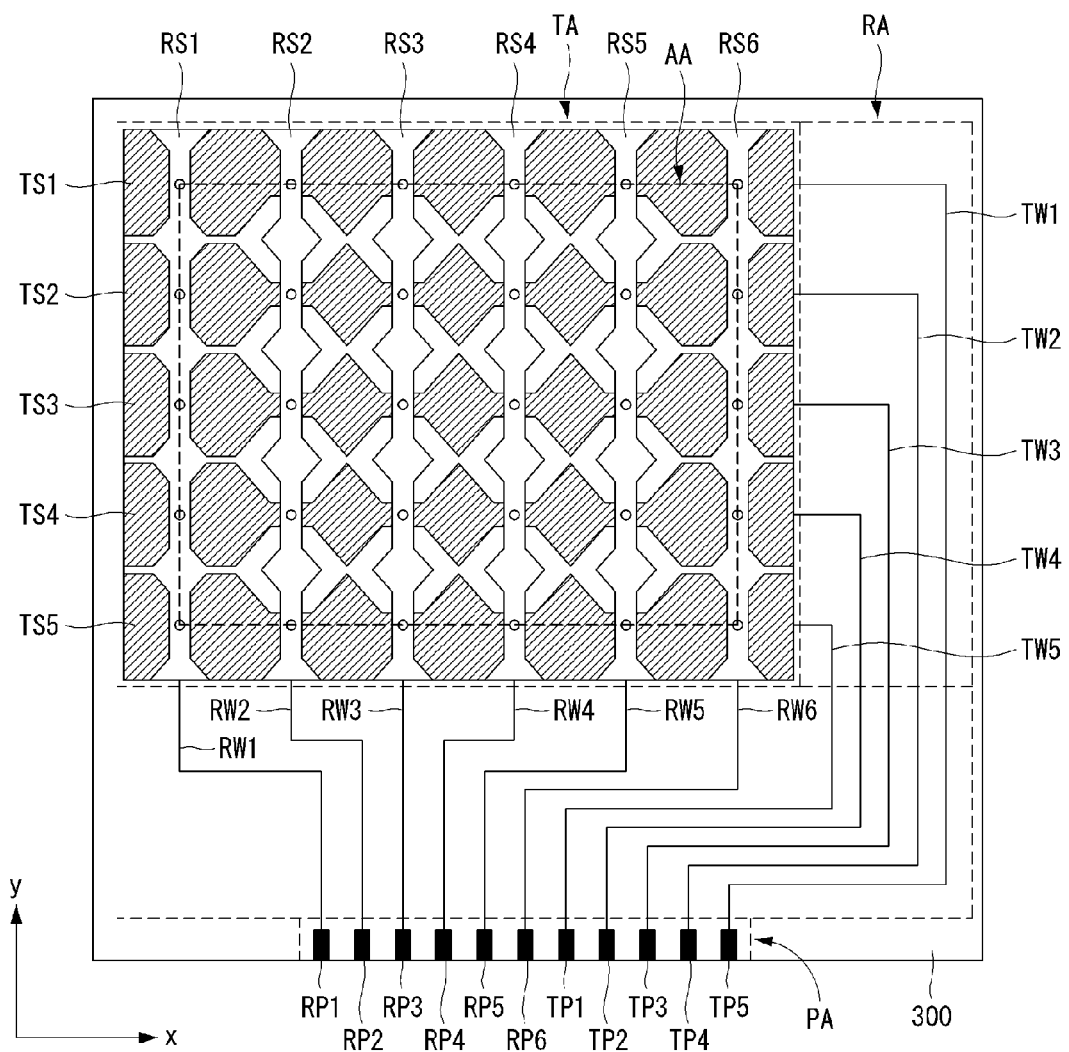
FIG. 7A is a plane view illustrating a touch sensing panel according to a third embodiment of this disclosure.
Figure 7B:
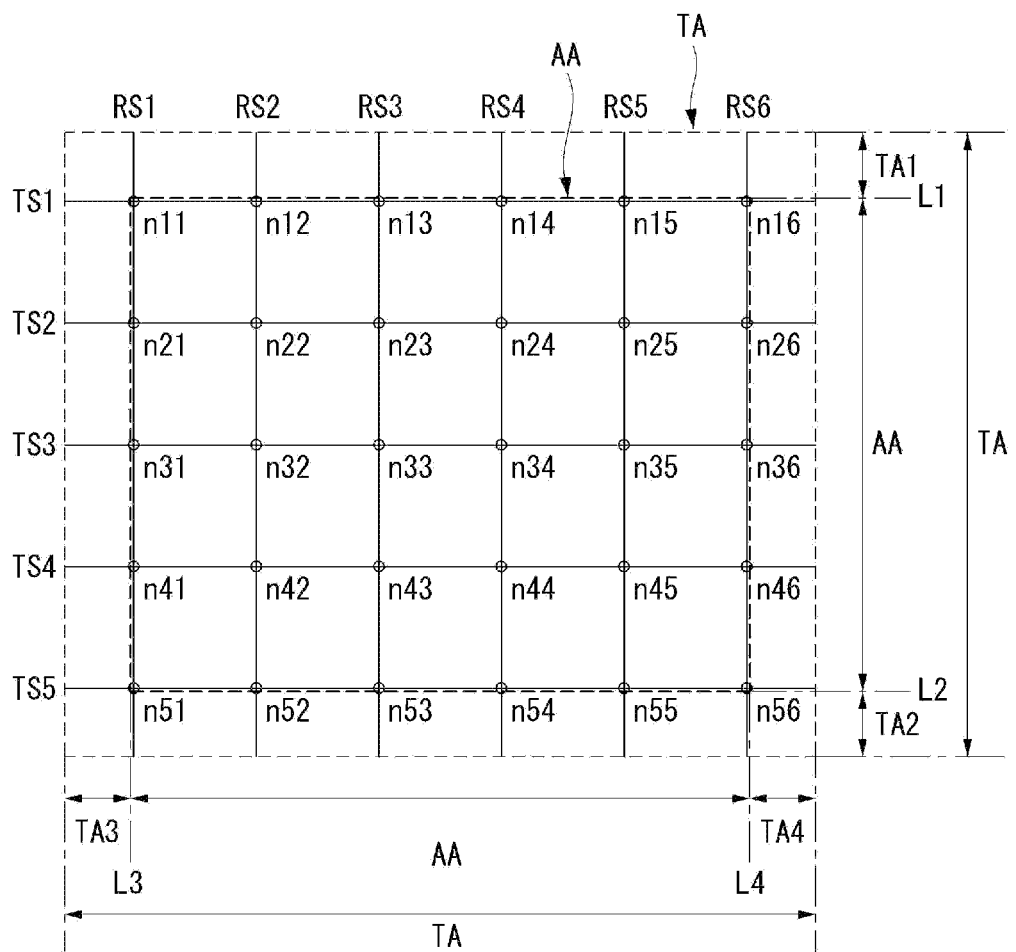
FIG. 7B is a conceptual view illustrating sensing nodes formed on the touch sensing panel shown in FIG. 7A.
Figure 8A:
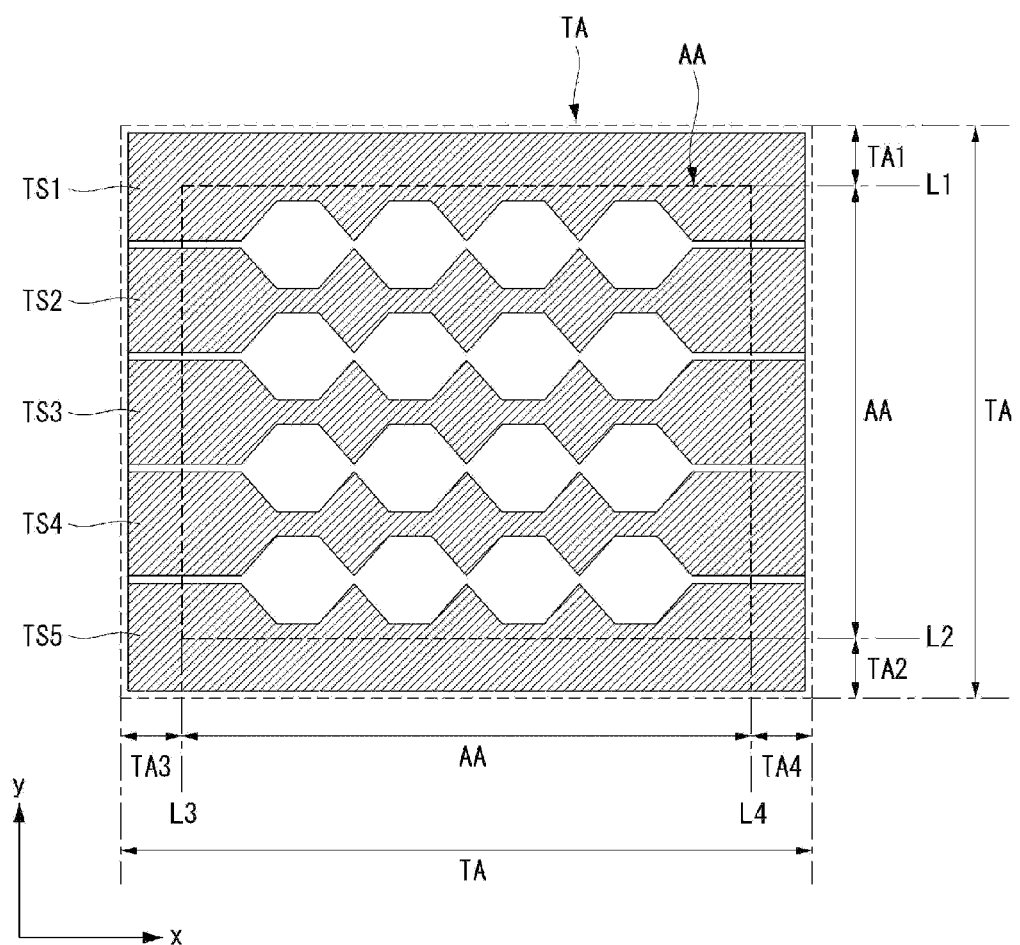
FIG. 8A is a plane view illustrating plurality of first touch electrode serials (touch drive electrode serials) of the touch sensing panel according to the third embodiment of this disclosure.
Figure 8B:
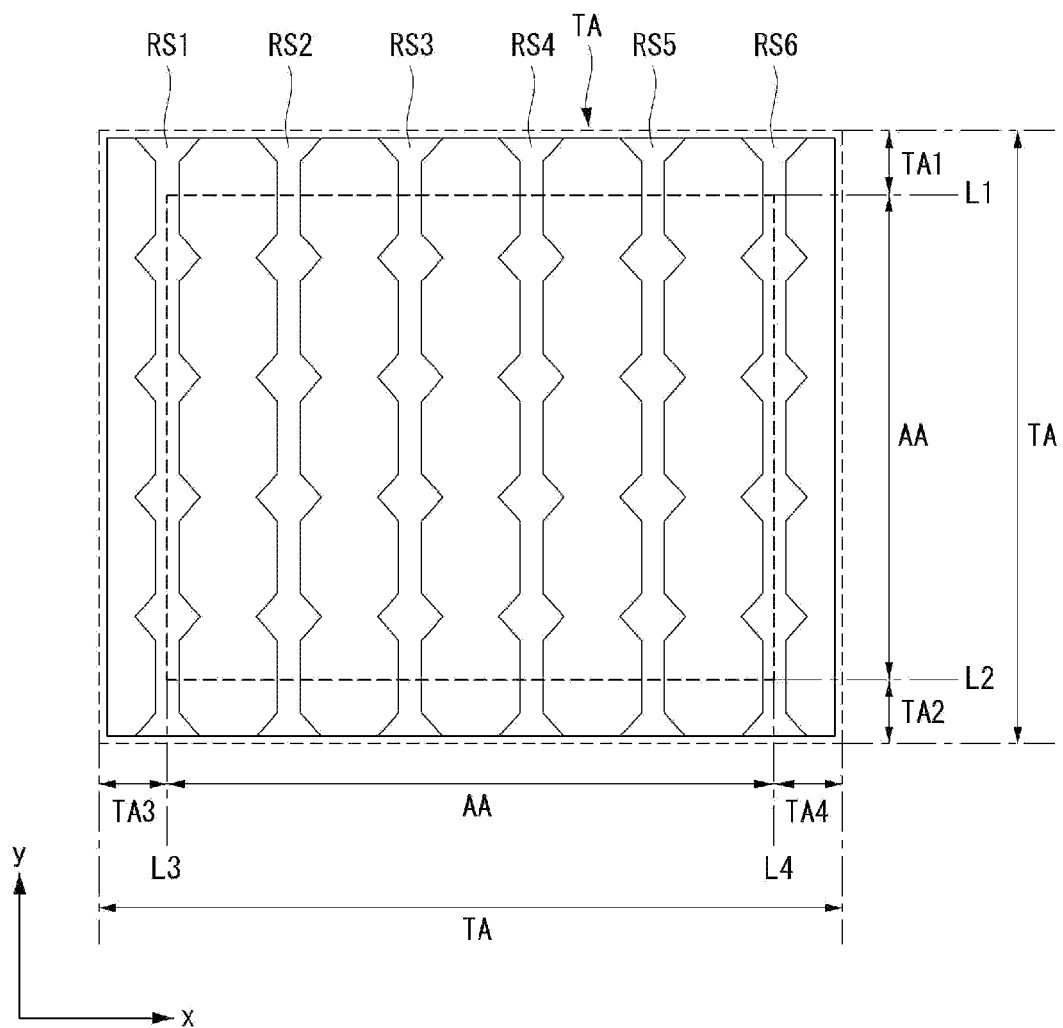
FIG. 8B is a plane view illustrating plurality of second touch electrode serials (plurality of touch sensing electrode serials) of the touch sensing panel according to the third embodiment of this disclosure.

Next, a touch sensing panel according to a third embodiment of this disclosure is described referring to FIGS. 7A, 7B, 8A and 8B. FIG. 7A is a plane view illustrating a touch sensing panel according to the third embodiment of this disclosure. FIG. 7B is a conceptual view illustrating sensing nodes formed on the touch sensing panel shown in FIG. 7A. FIG. 8A is a plane view illustrating plurality of first touch electrodes (touch drive electrodes) of the touch sensing panel according to the third embodiment of this disclosure. FIG. 8B is a plane view illustrating plurality of second touch electrodes (touch sensing electrodes) of the touch sensing panel according to the third embodiment of this disclosure.

Referring to FIGS. 7A, 7B, 8A and 8B, the touch sensing panel according to the third embodiment of this disclosure includes a touch electrode formation area TA, an active area AA, a routing wiring formation area RA, and a pad formation area PA. Touch electrodes are formed on the touch electrode formation area TA. The active area AA corresponds to a display area of a display apparatus (not illustrated) on which display data are displayed. Routing wirings are formed on the routing wiring formation area RA, in order to transmit and receive a signal to and from the touch electrode formation area TA. Routing pads for connecting the routing wirings and signal lines of a touch drive circuit (not illustrated) are formed on the pad formation area PA.

The touch sensing panel according to the third embodiment is different from the touch sensing panel according to the first embodiment in that electrode patterns of the first touch electrode serials that are on a borderline of the active area AA or are adjacent to the borderline are formed on up to the touch electrode formation area outside of the borderline (refer to FIG. 8A).

The touch electrode formation area TA includes plurality of first touch electrode serials TS1 to TS5 (touch drive electrodes), plurality of second touch electrode serials RS1 to RS6 (touch sensing electrodes), and sensing nodes n11 to n56. The first touch electrode serials TS1 to TS5 are arranged in parallel on a transparent substrate 300, in a first direction (for example, x-axis direction). The plurality of second touch electrode serials RS1 to RS6 are arranged in parallel in a second direction (for example, y-axis direction) in such a manner as to cross over the plurality of first touch electrode serials TS1 to TS5, respectively, with an insulation layer (not illustrated) therebetween. As illustrated in FIG. 7B, the sensing nodes n11 to n56 are formed at crossings of the plurality of first touch electrode serials TS1 to TS5 and the plurality of second touch electrode serials RS1 to RS6.

As illustrated in FIG. 7B, the active area AA is an area defined by intersecting the first imaginary line L1, the second imaginary line L2, the third imaginary line L3, and the fourth imaginary line L4. The first imaginary line L1 connects the uppermost sensing nodes n11, n12, n13, n14, n15, and n16 within the touch electrode formation area TA. The second imaginary line L2 connects the lowermost sensing nodes n51, n52, n53, n54, n55, and n56. The third imaginary line L3 connects the leftmost sensing nodes n11, n21, n31, n41 and n51. The fourth imaginary line L4 connects the rightmost sensing nodes n16, n26, n36, n46 and n56. The active area AA includes the first to fourth imaginary lines L1 to L4 is illustrated as an example in FIG. 7A, but this disclosure includes a case where the active area AA does not include the first to fourth imaginary lines L1 to L4.

The sensing nodes are set up in such a manner that they are included on the borderline of the active area AA or in the touch electrode formation area outside of the border. In the touch sensing panel according to the third embodiment of this disclosure, the sensing nodes n11, n12, n13, n14, n15, and n16 are set up in such a manner that they are included in the touch electrode formation area TA1 outside of the uppermost edge of the active area AA. And the sensing nodes n51, n52, n53, n54, n55, and n56 are set up in such a manner that they are included in the touch electrode formation area TA2 outside of the lowermost edge of the active area AA. And the sensing nodes n11, n21, n31, n41, and n51 are set up in such a manner that they are included in the touch electrode formation area TA3 outside of the leftmost edge of the active area AA. And the sensing nodes n16, n26, n36, n46, and n56 are set up in such a manner that they are included in the touch electrode formation area TA4 outside of the rightmost edge of the active area AA.

Referring to FIG. 8A, the uppermost and lowermost first electrode serials TS1 and TS5 are formed on up to the upper and lower touch electrode formation areas TA1 and TA2 outside of the active area AA, respectively. The electrode patterns that are to be formed on the leftmost and the rightmost first touch electrode serials TS1 to TS5 are formed on up to the left and right touch electrode formation areas TA3 and TA4 outside of the active area AA, from the inside of the active area AA, respectively. Therefore, the electrode patterns that are to be formed on the outermost portion (the uppermost portion, the lowermost portion, the leftmost portion, and the rightmost portion) are formed on the touch electrode formation areas TA1, TA2, TA3, and TA4 outside of the borderline of the active area AA as well, and thus the electrode patterns formed on the outermost portion are larger in size than the electrode patterns formed on the center portion of the active area AA. At this time, the first touch electrode serials TS1 to TS5 are formed in such a manner that they do not come into contact with one another.

Referring to FIG. 8B, the second touch electrode serials RS1 to RS6 are formed in such a manner as that they are the same in size and shape.

The routing wiring formation area RA is formed outside of the touch electrode formation area TA and includes a plurality of first routing wiring TW1 to TW5 and a plurality of second routing wiring RW1 to RW6. The first routing wiring TW1 to TW5 are connected to the first electrode serials TS1 to TS5, respectively. The second routing wiring RW1 to RW6 are connected to the second electrode serials RS1 to RS6, respectively. Each of the first routing wirings TW1 to TW5 and each of the second routing wirings RW1 to RW6 are made of a metal material, such as Al, AlNd, Mo, MoTi, Cu, Cr, Ag, and Ag alloy.

The pad formation area PA is formed outside of the routing wiring formation area RA and includes a plurality of first routing pads TP1 to TP5 and a plurality of second routing pads RP1 to RP6. The first routing pads TP1 to TP5 are connected to the of first touch electrode serials TS1 to TS5 through the first routing wiring TW1 to TW5, respectively. The second routing pads RP1 to RP6 are connected to the second electrode serials RS1 to RS6 through the second routing wirings RW1 to RW6, respectively. Each of the first routing pads TP1 to TP5 and each of the second routing pads RP1 to RP6 are made of a metal material, such as Al, AlNd, Mo, MoTi, Cu, Cr, Ag, and Ag alloy.

In the above-described touch sensing panel according to the third embodiment of this disclosure, the first touch electrode serials (the touch drive electrode serials) TS1 to TS5 are formed on the touch electrode formation areas TA1, TA2, TA3, and TA4 outside of the active area AA.

Therefore, the touch drive electrode formed on an edge part and a corner part of the active area AA is larger in size than the touch drive electrode formed on the center portion of the active area AA. Thus, a signal at the outermost sensing nodes is relatively more increased than a signal at the center sensing nodes. This provides an effect of improving the degree of precision of the touch at the edge and the corner part of the active area AA.

Figure 9A:
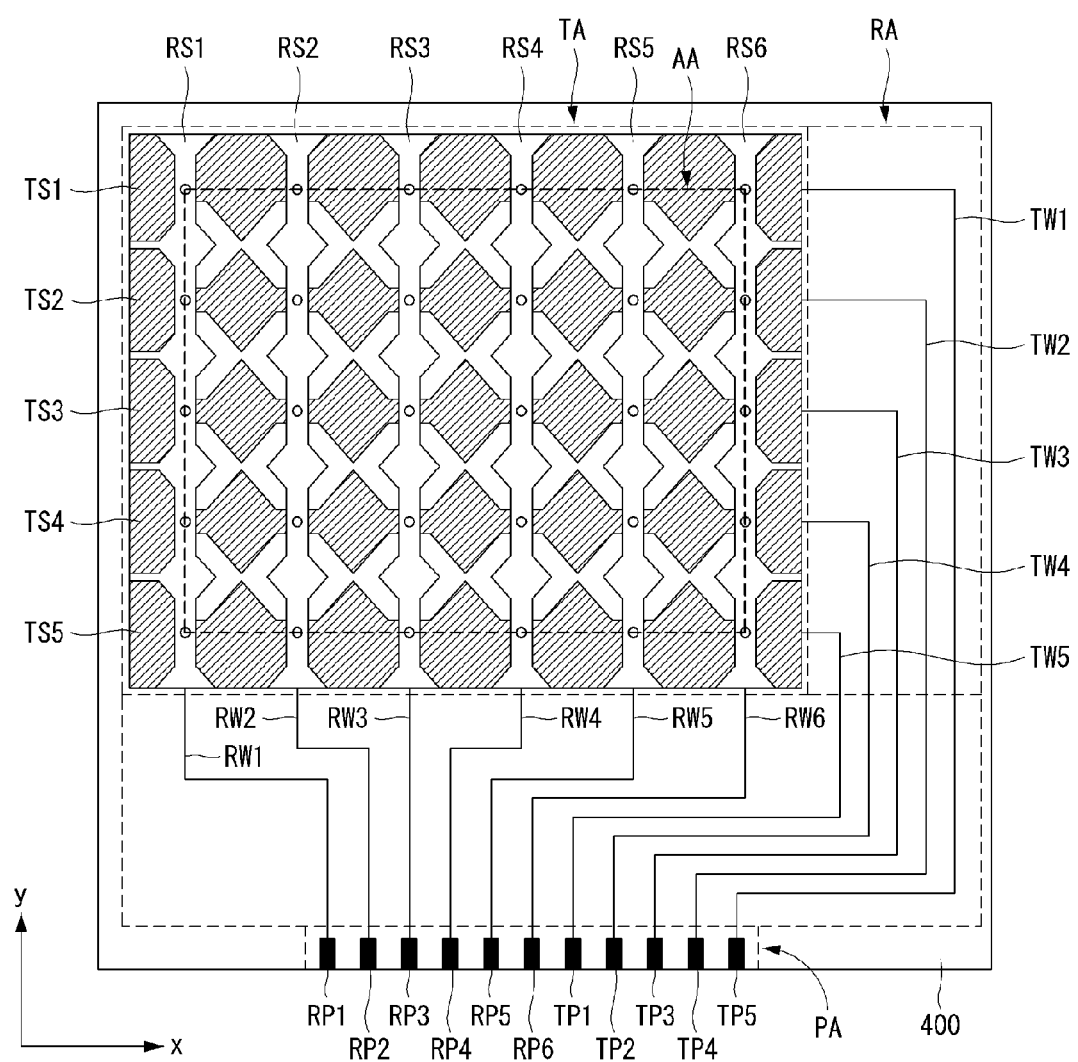
FIG. 9A is a plane view illustrating a touch sensing panel according to a fourth embodiment of this disclosure.
Figure 9B:
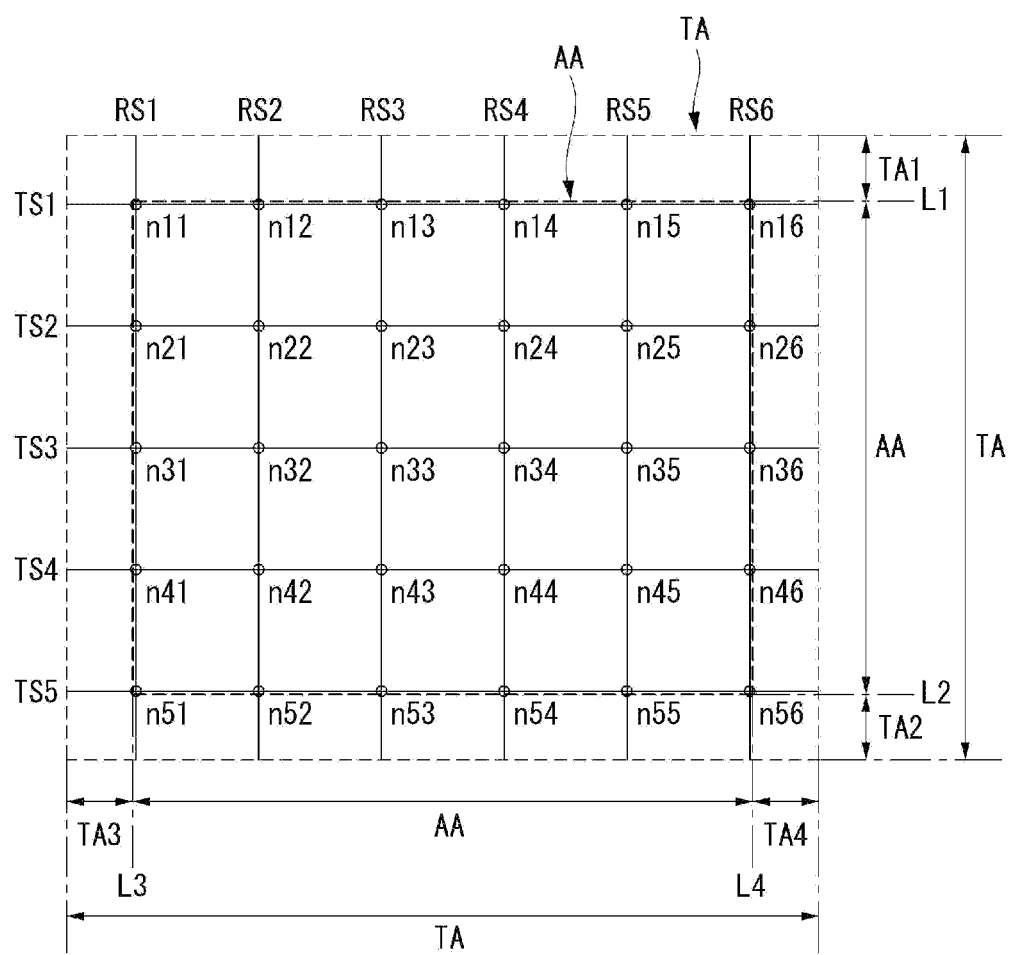
FIG. 9B is a conceptual view illustrating sensing nodes formed on the touch sensing panel shown in FIG. 9A.
Figure 10A:
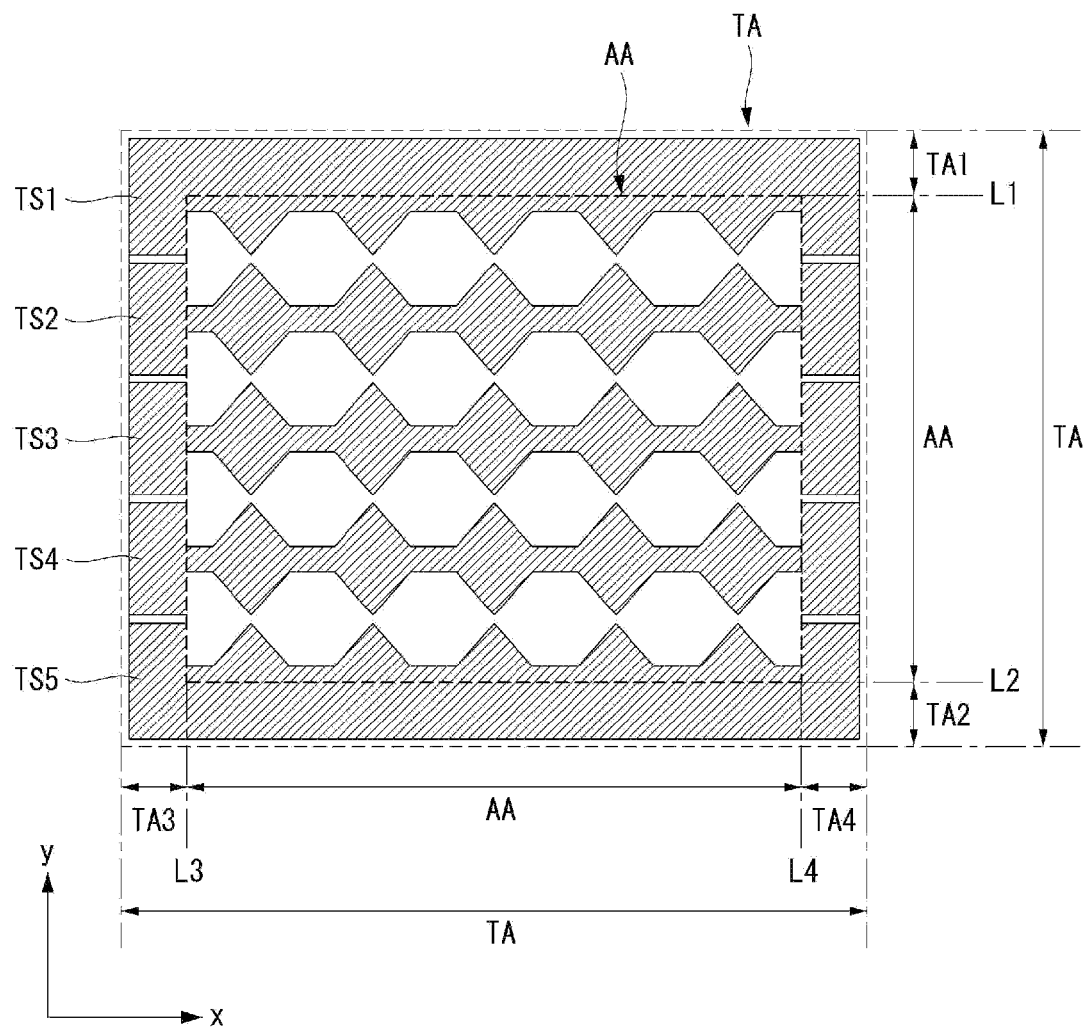
FIG. 10A is a plane view illustrating plurality of first touch electrode serials (touch drive electrode serials) of the touch sensing panel according to the fourth embodiment of this disclosure.
Figure 10B:
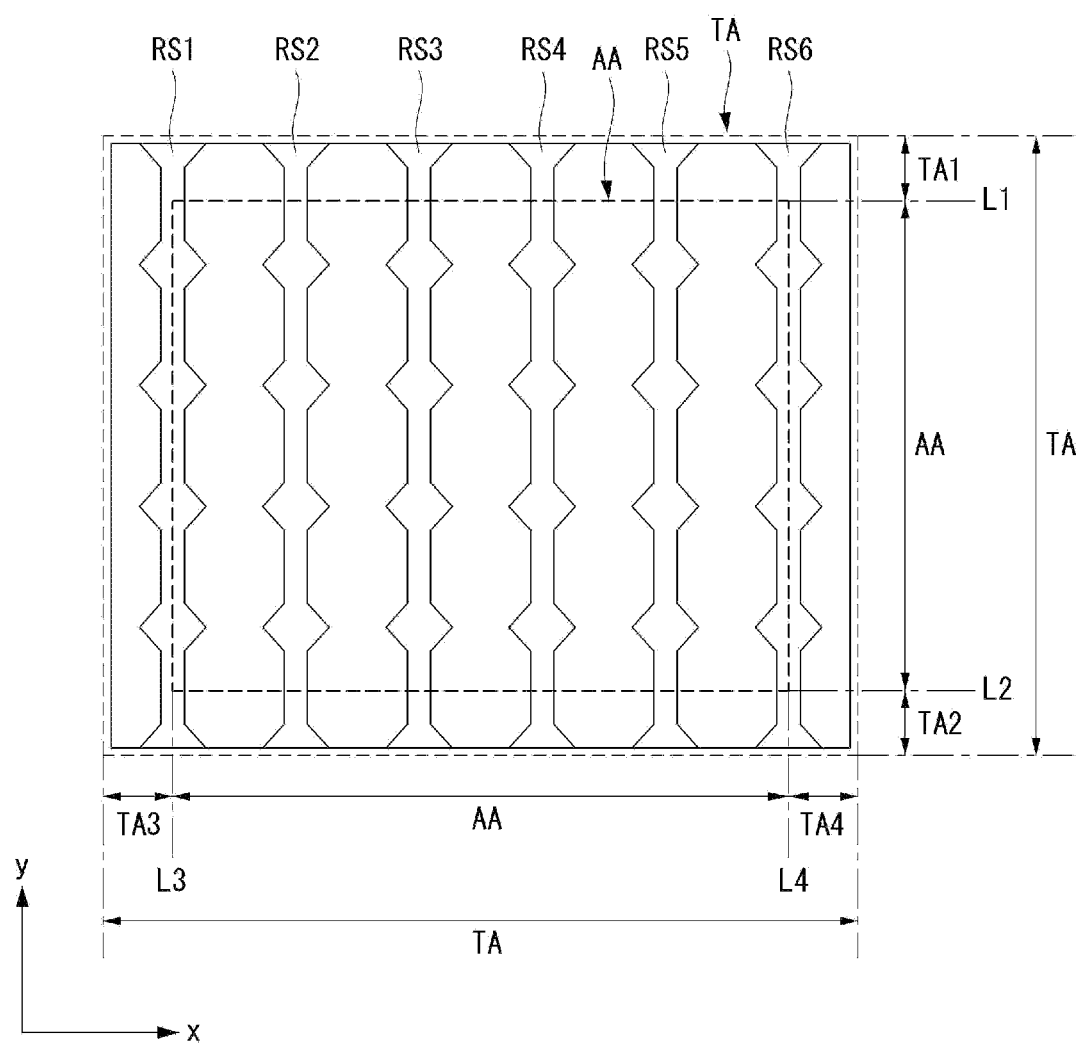
FIG. 10B is a plane view illustrating plurality of second touch electrode serials (touch sensing electrode serials) of the touch sensing panel according to the fourth embodiment of this disclosure.

Next, a touch sensing panel according to a fourth embodiment of this disclosure is described referring to FIGS. 9A, 9B, 10A and 10B. FIG. 9A is a plane view illustrating a touch sensing panel according to the fourth embodiment of this disclosure. FIG. 9B is a conceptual view illustrating sensing nodes formed on the touch sensing panel shown in FIG. 9A. FIG. 10A is a plane view illustrating plurality of first touch electrodes (touch drive electrode serials) of the touch sensing panel according to the fourth embodiment of this disclosure. FIG. 10B is a plane view illustrating second touch electrodes (touch sensing electrode serials) of the touch sensing panel according to the fourth embodiment of this disclosure.

Referring to FIGS. 9A, 9B, 10A and 10B, the touch sensing panel according to the fourth embodiment of this disclosure includes a touch electrode formation area TA, an active area AA, a routing wiring formation area RA, and a pad formation area PA. Touch electrodes are formed on the touch electrode formation area TA. The active area AA corresponds to a display area a display apparatus (not illustrated) on which display data are displayed. Routing wirings are formed on the routing wiring formation area RA, in order to transmit and receive a signal to and from the touch electrode formation area TA. Routing pads for connecting the routing wirings and signal lines of a touch drive circuit are formed on the pad formation area PA. The touch sensing panel according to the fourth embodiment is different from the touch sensing panel according to the third embodiment in that outermost electrode patterns of the first touch electrode serials are formed on up to the first to fourth touch electrode formation areas TA1 to TA4 outside of the borderline, from the borderline of the active area AA (refer to FIG. 10A).

The touch electrode formation area TA includes a plurality of first touch electrode serials TS1 to TS5 (touch drive electrode serials), a plurality of second touch electrode serials RS1 to RS6 (touch sensing electrodes), and sensing nodes n11 to n56. The plurality of first touch electrode serials TS1 to TS5 are arranged in parallel on a transparent substrate 400, in a first direction (for example, x-axis direction). The plurality of second touch electrode serials RS1 to RS6 are arranged in parallel in a second direction (for example, y-axis direction) in such a manner as to cross over the plurality of first touch electrode serials TS1 to TS5, respectively, with an insulation layer (not illustrated) therebetween. As illustrated in FIG. 9B, the sensing nodes n11 to n56 are formed at the crossings of the plurality of first touch electrode serials TS1 to TS5 and the plurality of second touch electrode serials RS1 to RS6.

As illustrated in FIG. 9B, the active area AA is an area defined by intersecting the first imaginary line L1, the second imaginary line L2, the third imaginary line L3, and the fourth imaginary line L4. The first imaginary line L1 connects the uppermost sensing nodes n11, n12, n13, n14, n15, and n16 within the touch electrode formation area TA. The second imaginary line L2 connects the lowermost sensing nodes n51, n52, n53, n54, n55, and n56. The third imaginary line L3 connects the leftmost sensing nodes n11, n21, n31, n41 and n51. The fourth imaginary line L4 connects the rightmost sensing nodes n16, n26, n36, n46 and n56. The active area AA defined by the first to fourth imaginary lines L1 to L4 is illustrated as an example in FIG. 9A, but this disclosure includes a case where the active area AA is formed within the area defined by the first to fourth imaginary lines L1 to L4.

The sensing nodes are set up in such a manner that they are included in the borderline of the active area AA or in the touch electrode formation area outside of the border. In the touch sensing panel according to the fourth embodiment of this disclosure, the sensing nodes n11, n12, n13, n14, n15, and n16 are set up in such a manner that they are included in the touch electrode formation area TA1 outside of the uppermost edge of the active area AA. And the sensing nodes n51, n52, n53, n54, n55, and n56 are set up in such a manner that they are included in the touch electrode formation area TA2 outside of the lowermost edge of the active area AA. And the sensing nodes n11, n21, n31, n41, and n51 are set up in such a manner that they are included in the touch electrode formation area TA3 outside of the leftmost edge of the active area AA. And the sensing nodes n16, n26, n36, n46, and n56 are set up in such a manner that they are included in the touch electrode formation area TA4 outside of the rightmost edge of the active area AA.

Referring to FIG. 10A, the uppermost and lowermost rows of first electrodes TS 1 and TS5 are formed on up to the upper and lower touch electrode formation areas TA1 and TA2, respectively, from the borderline of the active area AA. The electrode patterns that are to be formed on the leftmost portion and the rightmost portion of the rows of first touch electrode serials TS1 to TS5 are formed on up to the left and right touch electrode formations TA3 and TA4 outside of the active area AA, respectively, from the borderline of the active area AA. Therefore, the electrode patterns that are to be formed on the outermost portion (the uppermost portion, the lowermost portion, the leftmost portion, and the rightmost portion) are formed on the touch electrode formation areas TA1, TA2, TA3, and TA4 outside of the borderline of the active area AA as well, and thus the electrode patterns formed on the outermost portion are larger in size than the electrode patterns formed on the center portion of the active area AA. At this time, of course, the rows of first touch electrode serials TS1 to TS5 are formed in such a manner that they do not come into contact with one another.

Referring to FIG. 10B, the second touch electrode serials RS1 to RS6 are formed in such a manner as that they are the same in size and shape.

The routing wiring formation area RA is formed outside of the touch electrode formation area TA and includes a plurality of first routing wirings TW1 to TW5 and a plurality of second routing wirings RW1 to RW6. The first routing wirings TW1 to TW5 are connected to the first electrode serials TS1 to TS5, respectively. The second routing wirings RW1 to RW6 are connected to the second electrode serials RS1 to RS6, respectively. Each of the first routing wirings TW1 to TW5 and each of the second routing wirings RW1 to RW6 are made of a metal material, such as Al, AlNd, Mo, MoTi, Cu, Cr, Ag, and Ag alloy.

The pad formation area PA is formed outside of the routing wiring formation area RA and includes a plurality of first routing pads TP1 to TP5 and a plurality of second routing pads RP1 to RP6. The first routing pads TP1 to TP5 are connected to the first touch electrode serials TS1 to TS5 through the first routing wirings TW1 to TW5, respectively. The second routing pads RP1 to RP6 are connected to the second electrode serials RS1 to RS6 through the second routing wirings RW1 to RW6, respectively. Each of the multiple first routing pads TP1 to TP5 and each of the second routing pads RP1 to RP6 are made of a metal material, such as Al, AlNd, Mo, MoTi, Cu, Cr, Ag, and Ag alloy.

In the above-described touch sensing panel according to the fourth embodiment of this disclosure, the first touch electrode serials (touch drive electrode serials) TS1 to TS5 are formed on the touch electrode formation areas TA1, TA2, TA3, and TA4 outside of the active area AA.

Therefore, the touch drive electrode formed on an edge part and a corner art of the active area AA is larger in size than the touch drive electrode formed on the center portion of the active area AA. Thus, a signal at the outermost sensing nodes is relatively more increased than a signal at the center sensing nodes. This provides an effect of improving the degree of precision of the touch at the edge and the corner part of the active area AA.

Figure 11:
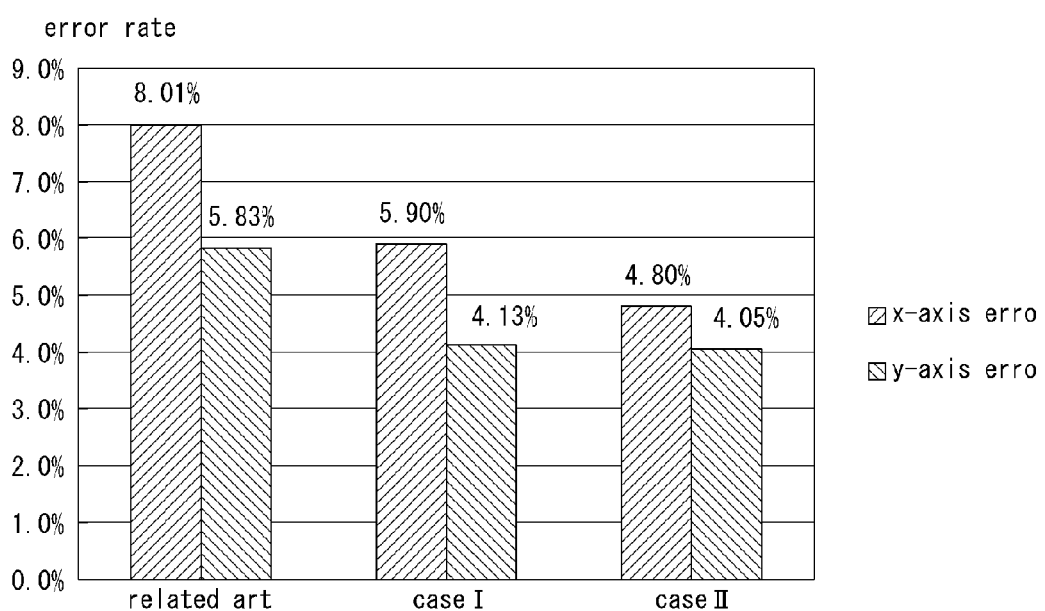
FIG. 11 is a histogram comparing average touch error rates of the touch sensing panel in the related art and the touch sensing panels according to the embodiments of this disclosure.

FIG. 11 is a histogram illustrating an average touch error rate of each of the touch sensing panel in the related art, the touch sensing panel of Case I, and the touch sensing panel of Case II. Case I is that the drive electrode patterns are formed on up to the upper and lower touch electrode formation areas TA1 and TA2 outside of the active areas AA, respectively. Case II is that the drive electrode patterns are formed on up to the upper, lower, left, and right touch electrode formation areas TA1, TA2, TA3, and TA4 outside of the active areas AA, respectively.

In the histogram in FIG. 11, a forward slash-marked bar indicates a touch error rate in the x-axis direction and indicates a backward slash-marked bar indicates a touch error rate in the y-axis direction. It is apparent from the histogram shown in FIG. 11 that in Case I and Case II, the error rates in the x-axis and y-axis directions are improved and that the error is more decreased in Case I and in Case II.

The touch sensing panel according to the embodiments of this disclosure can be applied to a display apparatus including a liquid display (LCD), a field emission display (FED), a plasma display panel (PDP), an electroluminescence device (EL), and an electrophoresis display apparatus.

It is apparent from the descriptions of the embodiments provided above that a person of ordinary skill in the art will make various changes and modifications within a scope deviating from the technological idea behind this disclosure. For example, according to the embodiments of this disclosure, the first touch electrode serials are described as the touch drive electrode serials, the second touch electrode serials are described as the touch sensing electrode serials, but it is apparent that the first touch electrode serials may be touch sensing electrode serials, and the second touch electrode serials may be touch driving electrode serials. In addition, the number of the first touch electrode serials, the second touch electrode serials, the first and second routing wirings and the first and second routing pads that are described in the embodiments of this disclosure is describe in one example. This means that a technological scope of this disclosure is not limited to the descriptions above provided, but is determined by the claims.

What is claimed is:

1. A touch sensing panel comprising:
   a substrate that includes a touch electrode formation area and an active area formed within the touch electrode formation area;
   a plurality of first conductive electrode serials that are arranged on the touch electrode formation area of the substrate in such a manner that the first conductive electrode serials are separated from one another along a first direction;
   a plurality of second conductive electrode serials that are arranged on the touch electrode formation area of the substrate in such a manner that the second conductive electrode serials are separated from one another along a second direction intersecting the first direction and that are electrically insulated from the plurality of first conductive electrode serials; and
   a plurality of sensing nodes that are positioned at crossings of the plurality of first conductive electrode serials and the plurality of second conductive electrode serials,
   wherein the active area is formed within an area defined by a first imaginary line, a second imaginary line, a third imaginary line, and a fourth imaginary line, such that the uppermost sensing nodes, the lowermost sensing nodes, the leftmost sensing nodes and the rightmost sensing nodes are located outside of the active area defined by the first, second, third and fourth imaginary lines,
   wherein the active area corresponds to a display area and the active area is smaller than the touch electrode formation area,
   wherein an outer portion of the touch electrode formation area located outside the area defined by the first, second, third and fourth imaginary lines does not correspond to the display area,
   wherein a touch input received anywhere within the area defined by the first, second, third and fourth imaginary lines is sensed by at least four adjacent sensing nodes surrounding the touch input, and
   wherein the touch sensing panel is configured to calculate a touch position of the touch input with at least two adjacent sensing nodes within the touch electrode formation area and outside the active area, in response to the input being applied to an edge of the active area.

2. The touch sensing panel according to claim 1, wherein the leftmost sensing nodes and the rightmost sensing nodes are located outside of the active area and within the touch electrode formation area.

3. The touch sensing panel according to claim 1, wherein the uppermost sensing nodes and the lowermost nodes are located outside of the active area and within the touch electrode formation area.

4. The touch sensing panel according to claim 3, wherein each of the plurality of first conductive electrode serials are formed of a plurality of electrode patterns, and
   wherein leftmost electrode patterns of the plurality of first conductive electrode serials are larger in size than inner electrode patterns formed within the active area.

5. The touch sensing panel according to claim 4, wherein rightmost electrode patterns of the plurality of first conductive electrode serials are larger in size than the inner electrode patterns formed within the active area.

* * * * *